United States Patent

[11] 3,599,347

[72] Inventor Roger W. Bodley
    Chesterland, Ohio
[21] Appl. No. 835,498
[22] Filed June 23, 1969
[45] Patented Aug. 17, 1971
[73] Assignee Education Research Council of America
    Cleveland, Ohio

[54] EDUCATIONAL DEVICE
5 Claims, 4 Drawing Figs.

[52] U.S. Cl. .................................................... 35/19 R,
                                                          73/12
[51] Int. Cl. ............................................... G09b 23/06
[50] Field of Search ................................ 273/118,
    119, 128, 382, 129; 73/79, 12, 13, 14; 35/19, 45

[56] References Cited
UNITED STATES PATENTS
3,196,558  6/1965  Webb .......................... 35/45
874,110  12/1907  Packard ...................... 73/382

OTHER REFERENCES
Stansi Scientific Division, Fisher Scientific Co., 1968, p. 119. Copy in Group 336 Library.

Sears and Zemansky, College Physics, Mass., Addison-wesley, 3rd. ed. 1960 P. 163— 164.

*Primary Examiner*—Robert W. Michell
*Assistant Examiner*—Lewis Anten
*Attorney*—Meyer Tilberry and Body ABSTRACT: An educational device which is useful in training and testing students in such basic thought processes as problem analysis and extrapolation. The device consists of a pair of articulated members, one of which defines an inclined track. A rolling member launched along the track is projected from the track lowermost end onto a hard surface equipped with means for recording the points of initial and secondary impact of the rolling member. The student is trained or tested by analyzing the variations in impact points.

The device also has a plurality of parallel uniformly spaced elastic bands extending between the members the lengths of which increase with distance from the point of articulation of the members. The plural bands permit the extrapolation of values which differ with different angles of articulation of the members.

PATENTED AUG 17 1971 3,599,347
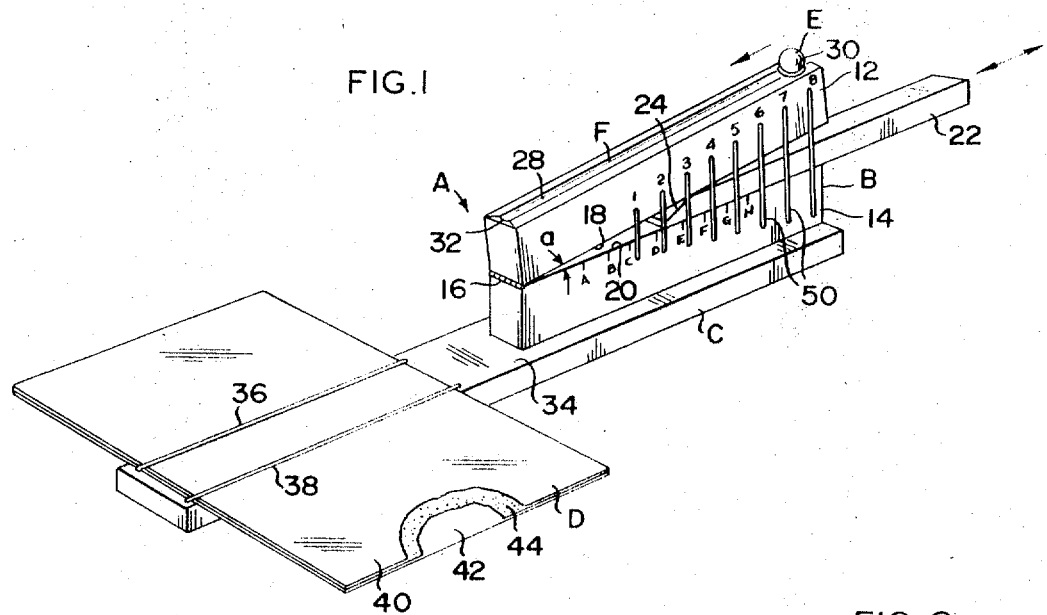
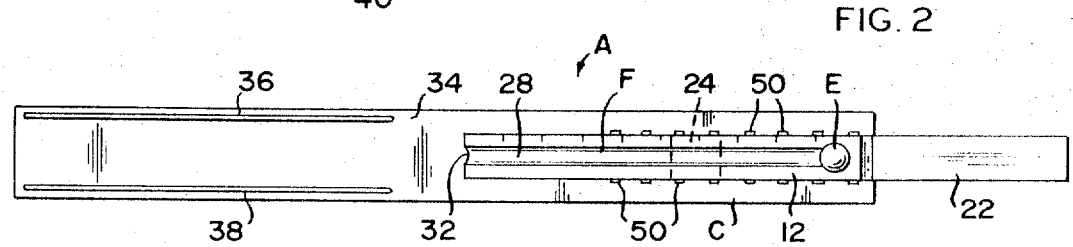
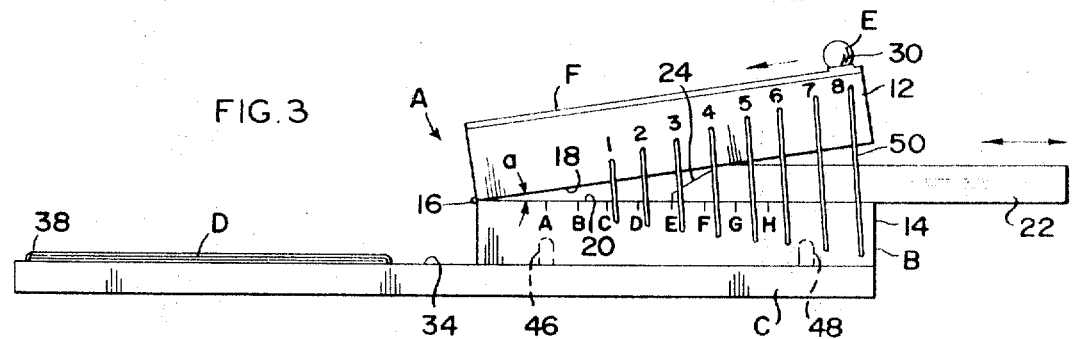
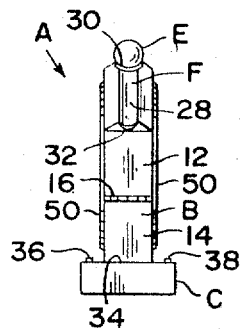
INVENTOR.
ROGER W. BODLEY
BY
*Meyer, Tilberry & Body*
ATTORNEYS.

EDUCATIONAL DEVICE

The present invention relates to an educational device, and in particular to a device which is useful in many aspects of training and/or testing students.

The invention is particularly applicable to the processes of problem analysis and extrapolation, and will be described with particular reference thereto, although it will be appreciated that the invention has broader applications such as training and/or testing in measurement and preparing graphs.

The process of problem analysis includes the steps of formulation or recognition of a problem, collection of data through observation and experiment, and formulation and testing of hypotheses to solve the problem. The present invention provides a novel, simple and economical teaching tool by which students of various levels of ability can not only be individually instructed in the process of problem analysis, but also individually tested as to their level of understanding of the process.

In this respect, the present invention provides a simple and economical educational device in the nature of a visual aid which is capable of generating data showing variation, and further which is capable of duplicating the data within limits.

In accordance with this aspect of the present invention, there is provided a teaching device comprising means to establish an inclined track terminating above a hard surface, and means associated with the surface for recording the points of primary and secondary impact of a member rolling down and off the inclined track. The rolling member follows different trajectories from the lowermost end of the track so that it develops a data pattern on the recording surface.

Preferably, the device includes a pair of articulated members including means to adjust the relative angle between the members, one of the members defining the inclined track, the other member being operatively connected with said hard surface.

It is a feature of the invention that the device comprises a bouncing board defining said hard surface, the bouncing board being equipped with a recording means onto which the rolling member is projected from the track. A student is individually trained and/or tested in analyzing problems by analyzing the variations in impact points of the rolling member on the recording means.

The process of extrapolation involves the inference of values based on observed trends. In accordance with a further aspect of the invention, the device is provided with a plurality of parallel uniformly spaced elastic bands the lengths of which increase in periodic steps from the point of articulation of the members. These lengths are variable with the angle of articulation of the members. Students are individually trained and/or tested in the principles of extrapolation by analyzing the rates of increase of the lengths of the bands.

In addition to teaching and/or testing in the principles of problem analysis and extrapolation, it will become apparent that the present invention also is useful in such thought processes as measurement and preparing graphs.

Accordingly, it is an object of the invention to provide a universal teaching device useful in training and/or testing students in a large number of basic thought processes.

It is a particular object of the invention to provide a device useful in training and/or testing students in problem analysis and extrapolation.

The invention and other aspects thereof will become apparent upon consideration of the following specification, with reference to the accompanying drawings, in which FIG. 1 is a perspective view of a training and/or testing device in accordance with the invention;

FIG. 2 is a plan view of the device of FIG. 1;

FIG. 3 is an elevation side view of the device of FIG. 1; and

FIG. 4 is an elevation front view of the device of FIG. 1.

Referring now to the drawings wherein the showings are for the purpose of illustrating the preferred embodiment of the invention only and not for the purpose of limiting the same, the Figures show an educational device A including a member B positioned on and operatively connected with a bouncing board C, the latter retaining and supporting a recording means D. The member B defines a sloping track F on which a rolling member or ball E is adapted to roll, the ball E being projected from the track lowermost end onto the recording means D.

The member B comprises articulated upper and lower jaw portions 12 and 14 which are each in the shape of an elongated rectangular block. These jaw portions are connected together at one end by hinge means 16 so that they are stacked one above the other to define adjacent surfaces 18 and 20 which are in contact, or which define an acute angle a. By the hinge means, the upper and lower jaw portions 12 and 14 are positionable at different angles of articulation with respect to each other, the device including wedge means 22 positionable between the upper and lower jaw portion surfaces 18 and 20 to adjust the angle of articulation. The wedge means also is an elongated rectangular member having a sloping leading surface 24 which penetrates into the space between the jaw portions, the thickness of the wedge means and amount of penetration determining the size of the angle a.

The upper surface of the upper jaw portion 12 defines the track F having a longitudinally extending groove 28 running substantially the full length of the portion. The width of the track is that required to confine the ball E to a relatively straight path. At the end of the track furthermost removed from the hinge, there is provided a suitable launching platform or seat 30, best shown in FIG. 3, capable of holding the rolling member or ball E stationary until it is launched along the track. At the end closest to the hinge, the groove of the track is cut away at 32 (FIG. 2) so that only the upper edges of the groove contact the ball. In this way the ball is projected in a straight and repeatable line from the track.

The bouncing board C consists of an elongated member which is rectangular in cross section of much greater length than the articulated members or jaw portions 12 and 14, and of somewhat greater width. It defines an upper flat surface 34, which supports at one end the lower jaw portion 14. In front of the articulated members, there are provided parallel spaced-apart stretch bands 36 and 38 extending longitudinally parallel with the orientation of the articulated members 12 and 14. The distance between the bands is slightly greater than the widths of the articulated members.

The bands are of approximately equal length sufficient to accommodate the recording means D, the stretch bands holding the recording means against the upper surface 34 of the bouncing board. In the embodiment shown in the Figures, the recording means is in the form of two sheets 40 and 42 of thin paper between which is sandwiched a sheet 44 of carbon paper. To fasten or hold the articulated members 12 and 14 on the bouncing board C, the latter is provided with a pair of spaced-apart dowels 46 and 48, FIG. 3, positioned axially on the board which engage openings in the lower jaw portion 14. The dowels permit the members 12 and 14 to be removed from the bouncing board for ease of storage.

It is apparent that depending upon the thickness of the wedge 22 and its penetration between the jaw portions 12 and 14, the track F will have a certain slope. In operation, the device is placed upon a horizontal surface and the jaw portions are adjusted to a desired angle of articulation. Following this, the ball E is placed in its launching platform 39 at the launching end of track F and is launched from the platform to roll down the track. It is projected from the track in a trajectory which causes it to land between the stretch bands 36 and 38 on the recording means, the point of contact being recorded on the lower sheet 42 of paper through the carbon paper 44. The ball also bounces to establish a second point of contact further removed from the articulated members. With repeated launches of the ball, a pattern of first and second points of contact depending on several variables will be established on the lower sheet of paper, this pattern constituting generated data.

Training and testing students results from hypothesizing on the reason for the data pattern, setting a procedure to verify the hypothesis, formulating conclusions and reporting on the above.

In order to provide as accurate data as possible, it is desirable that the upper surface of the bouncing board be hard, and Formica (trademark) has been found to be a satisfactory surface, one which is not subject to permanent deformation and which is at the same time sufficiently hard to avoid the blurring effect which would occur with softer surfaces. The ball preferably is of steel or a similar hard material.

It is desirable, for reasons to be described, to be able to repeat or duplicate data patterns. For this purpose, at least one of the articulated members, in this instance the lower member, has along at least one side spaced indicia labeled A, B, C,...... By inserting the wedge up to one of the indicia, for instance D, or E, the angle between the upper and lower jaw portions and thus the slope of the track F relative to the bouncing board surface 34 is repeatedly set at a desired value. Alternately, a protractor could be used for this purpose suitably connected to the sides of the jaw portions to show the angle $a$, or a student can be asked to measure the angle or angles used. The latter recourse would be useful in teaching younger students the principles of measurement, particularly angle measurement.

Indicia can also be provided along the track surface to provide a means for varying in a repeated manner the distance of travel of the ball E on the track.

As illustrated in the Figures, the upper and lower members or jaws 12, 14 of the articulated members are biased together by a plurality of parallel stretch bands 50 extending between the jaw portions. In addition to the function of biasing the jaw portions together, the stretch bands also serve to provide a means for individually training and testing students in the principles of extrapolation. The stretch bands are spaced at periodic equally spaced intervals numbered 1, 2, 3, 4... and increase in length in the direction away from the hinge and or point of articulation of the members 12 and 14. The points of connection of the stretch bands with the members 12, 14 are not parallel to the adjacent surfaces 18 and 20 of the members but rather are further removed from these surfaces as the distance from the point of articulation increases. However, drawing lines through all of the points of connection for each of the members 12 and 14 causes the lines to intersect at the hinge 16. Because of this and the uniform spacing of the bands, it is apparent that the lengths of the bands will increase in uniform increments in the direction away from the hinge end, and although the increase will be different for different angles $a$ of articulation of the members 12 and 14, the increase will be uniform for each angle. The student is trained or tested by being asked to extrapolate lengths or values at points removed from the hinge 16 other than points 1, 2, 3, 4... . Since the rates of increase in lengths of the bands are disproportionate to the angles of articulation between the members 12 and 14, a large number of students can practically be tested individually as to their grasp or understanding of the process of extrapolation.

In the embodiment shown in the Figures, the bands 50 are continuous passing through holes at the points of connection 1, 2, 3, 4... of the members 12 and 14, and extending between the members on both sides thereof. The holes permit the articulated members to be positioned on their side on a piece of graph paper with one of the edges 18, 20 of the members parallel to a coordinate of the graph. For each angle $a$ the student can physically graph the increase in length in the bands, training a student in the principles of preparing graphs.

Other uses for the device of the present invention will be apparent to those in the educational field. For instance, it may be desired to test a group of children of young age on their skill in such a simple task as use of a ruler. The educational device affords numerous opportunities for measurement; such as, the horizontal and vertical distances between the lowermost end of the track F and the points of first and second contact of the ball E on the recording means D; the angle $a$; and the distance of penetration of the wedge between the members 12 and 14.

A particular advantage of the present invention is that a large number of students can be individually tested in a variety of learning processes with different sets of data for each student. A typical area of investigation could be correlation between the distance of bounce of a marble and its size or weight the use of different materials, and the effect of force of launch. A problem could be stated as: "When different sized marbles roll from the slope they land in different spots and bounce different distances. Write a report which includes a restatement of the problem, an explanation of the procedure followed to solve the problem, observations including measurements and tables, and conclusions". For the investigation, the student would have to formulate and test various hypotheses, but an important feature is that the slope of the track F could be set at a different values for different students, providing different sets of data and requiring independent investigation on the part of each of the students.

At the same time, for a particular setting, the data can be duplicated permitting an instructor to judge the proficiency of the student.

Other advantages are that the device is simple and inexpensive, and at the same time provides a means for training and testing students at many different levels of learning and ability, in many different areas of skills.

Many variations are possible. For instance, instead of just a seat for the ball for launching and positioning it, the device can be provided with a gate. The ball can be of a variety of materials, and other surfaces besides Formica can be used for the bouncing board. Other arrangements also could be used for varying the slope of the track F, and different recording means are available, for instance an ink coated ball.

Although the invention has been described with reference to a specific embodiment, variations within the scope of the following claims will be apparent to those skilled in the art.

What I claim is:

1. An educational device comprising
   means to establish a sloping surface including upper and lower articulated members;
   means for varying the angle of articulation of said members;
   track means on said surface to constrain movement of a rolling member along said surface;
   a recording means;
   means spacing said track means above said recording means so that the latter records the points of impact of the rolling member with the recording means; and
   a plurality of parallel stretch bands biasing said articulated members together, said stretch bands being positioned at equally spaced intervals removed from the axis of articulation of the members, the stretch bands increasing in length in equal increments proportional to the distance of the band from the axis of articulation.

2. The device of claim 9 further including a bouncing board defining a flat hard upper surface, means for connecting the lower of said articulated members to said surface, and means on said surface for holding said recording means to the surface, said recording means comprising sheets of overlying paper with an intermediate sheet of carbon paper.

3. The device of claim 1 wherein said articulated members have a plurality of parallel holes parallel to the axis of articulation of the members defining the points of connection of the stretch bands to the members the stretch bands being continuous and extending through the holes and along both of the opposite sides of the members.

4. An educational device comprising
   means to establish a sloping surface including upper and lower articulated members;
   means for varying the angle of articulation of said members comprising wedge means insertable between the members;
   track means on said surface to constrain movement of a rolling member along said surface;
   a recoding means;

means spacing said track means above said recording means so that the latter records the points of impact of the rolling member with the recording means; and indicia on the sides of said members, said indicia being an indication of the penetration of the wedge means and thus the angle of articulation.

5. The device of claim 4 including indicia means on said track means.